US010696063B2

(12) United States Patent
Nishii et al.

(10) Patent No.: US 10,696,063 B2
(45) Date of Patent: Jun. 30, 2020

(54) IMAGE FORMING APPARATUS BODY AND IMAGE FORMING APPARATUS

(71) Applicants: Toshikane Nishii, Kanagawa (JP); Hiroshi Ishii, Kanagawa (JP); Kunihiko Nishioka, Kanagawa (JP); Akiyoshi Tanaka, Kanagawa (JP); Yasunari Harada, Kanagawa (JP); Mitsutaka Nakamura, Kanagawa (JP)

(72) Inventors: Toshikane Nishii, Kanagawa (JP); Hiroshi Ishii, Kanagawa (JP); Kunihiko Nishioka, Kanagawa (JP); Akiyoshi Tanaka, Kanagawa (JP); Yasunari Harada, Kanagawa (JP); Mitsutaka Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/233,522

(22) Filed: Dec. 27, 2018

(65) Prior Publication Data
US 2019/0283453 A1 Sep. 19, 2019

(30) Foreign Application Priority Data

Mar. 17, 2018 (JP) ................ 2018-050286

(51) Int. Cl.
*B41J 3/36* (2006.01)
*B41J 29/02* (2006.01)
*B41J 29/38* (2006.01)
*B41J 2/045* (2006.01)

(52) U.S. Cl.
CPC ............. *B41J 3/36* (2013.01); *B41J 29/023* (2013.01); *B41J 29/38* (2013.01); *B41J 2/04501* (2013.01)

(58) Field of Classification Search
CPC ..... B41J 29/13; B41J 3/36; B41J 29/38; B41J 29/023; B41J 2/04501
See application file for complete search history.

(56) References Cited

U.S. PATENT DOCUMENTS

| 4,750,049 A | 6/1988 | Murakami et al. |
| 4,928,183 A | 5/1990 | Yajima |
| 5,052,832 A | 10/1991 | Akiyama et al. |
| 2010/0207990 A1 | 8/2010 | Ito et al. |

(Continued)

FOREIGN PATENT DOCUMENTS

| JP | S5583369 A | 6/1980 |
| JP | 1-271263 | 10/1989 |
| JP | 2008-080550 | 4/2008 |

OTHER PUBLICATIONS

U.S. Appl. No. 15/929,044, filed Sep. 19, 2018, Hideaki Iijima, et al.

(Continued)

*Primary Examiner* — Jannelle M Lebron
(74) *Attorney, Agent, or Firm* — Harness, Dickey and Pierce, P.L.C.

(57) ABSTRACT

A mobile image forming apparatus includes a body; a recording device supported by the body and configured to form an image on a recording medium, and at least one roller provided to the body and configured to rotate on the recording medium while the body is moved in a scanning direction for image formation. The mobile image forming apparatus further includes at least one pressing member disposed in contact with the at least one roller and configured to press the at least one roller in a roller axial direction.

12 Claims, 11 Drawing Sheets

(56) References Cited

U.S. PATENT DOCUMENTS

| | | |
|---|---|---|
| 2011/0109692 A1 | 5/2011 | Ito et al. |
| 2011/0141181 A1 | 6/2011 | Ito et al. |
| 2011/0298873 A1 | 12/2011 | Katsuyama et al. |
| 2012/0056932 A1 | 3/2012 | Matsubara et al. |
| 2012/0056933 A1 | 3/2012 | Tanaka et al. |
| 2012/0081487 A1 | 4/2012 | Tanaka et al. |
| 2012/0113180 A1 | 5/2012 | Tanaka et al. |
| 2012/0113204 A1 | 5/2012 | Tanaka et al. |
| 2012/0133707 A1 | 5/2012 | Kikkawa et al. |
| 2012/0147112 A1 | 6/2012 | Tanaka et al. |
| 2014/0167580 A1 | 6/2014 | Funayama et al. |
| 2016/0082719 A1 | 3/2016 | Harada et al. |
| 2016/0107467 A1 | 4/2016 | Nakata et al. |
| 2018/0250947 A1 | 9/2018 | Nakata et al. |
| 2018/0250948 A1 | 9/2018 | Harada et al. |
| 2018/0354257 A1 | 12/2018 | Watanabe et al. |
| 2018/0361761 A1 | 12/2018 | Okeguchi et al. |

OTHER PUBLICATIONS

U.S. Appl. No. 16/103,502, filed Aug. 14, 2018, Toshiaki Hosokawa, et al.

Extended European Search Report dated Jul. 8, 2019, issued in corresponding European Patent Application No. 18214752.0.

IMAGE FORMING APPARATUS BODY AND IMAGE FORMING APPARATUS

CROSS-REFERENCE TO RELATED APPLICATION

This patent application is based on and claims priority pursuant to 35 U.S.C. § 119(a) to Japanese Patent Application No. 2018-050286, filed on Mar. 17, 2018, in the Japan Patent Office, the entire disclosure of which is hereby incorporated by reference herein.

BACKGROUND

Technical Field

The present disclosure generally relates to a mobile image forming apparatus body and a mobile image forming apparatus incorporating same.

Description of the Related Art

There are mobile image forming apparatuses in which a roller is provided to a mobile image forming apparatus body housing a recording device to form an image on a recording medium. Such a mobile image forming apparatus forms an image on the recording medium while being moved in a scanning direction with the roller contacting the recording medium and rotating on the recording medium.

SUMMARY

According to an embodiment of this disclosure, a mobile image forming apparatus includes a body, a recording device supported by the body and configured to form an image on a recording medium, and at least one roller provided to the body and configured to rotate on the recording medium while the body is moved in a scanning direction for image formation. The mobile image forming apparatus further includes at least one pressing member disposed in contact with the at least one roller and configured to press the at least one roller in an axial direction of the at least one roller.

Another embodiment provides a body of a mobile image forming apparatus to form an image on a recording medium. The body is configured to house the recording medium and includes at least one roller configured to rotate on the recording medium while the body is moved in a scanning direction for image formation and at least one pressing member disposed in contact with the at least one roller and configured to press the at least one roller in a roller axial direction.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
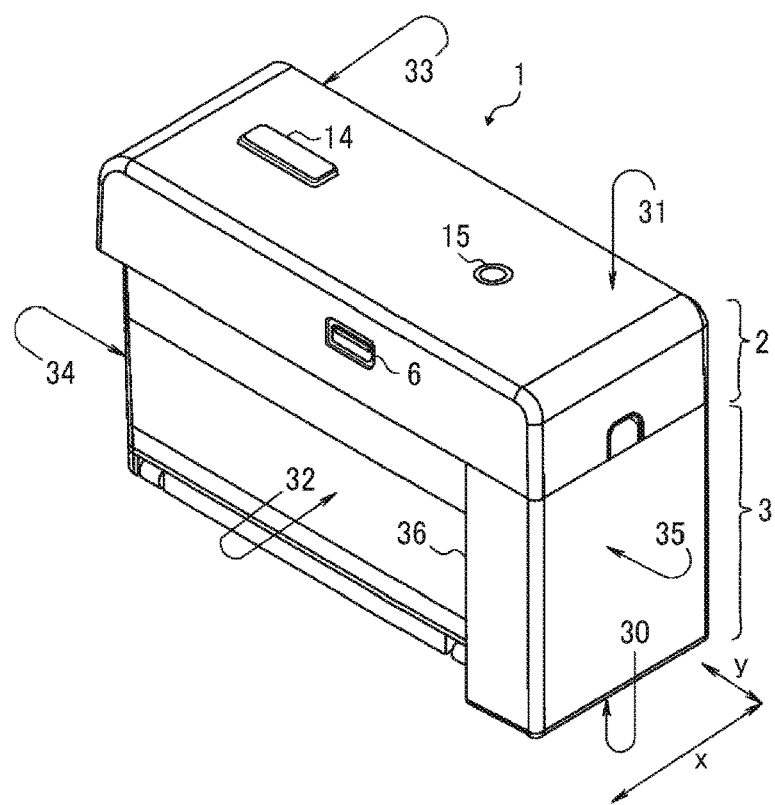
FIG. 1 is a perspective view illustrating an exterior of a handheld mobile inkjet printer (hereinafter simply "handheld printer") according to an embodiment of the present disclosure, as viewed obliquely from above.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, as an example of a mobile image forming apparatus according to an embodiment of this disclosure, a handheld mobile inkjet printer (hereinafter simply referred to as "handheld printer") is described. As used herein, the singular forms "a", "an", and "the" are intended to include the plural forms as well, unless the context clearly indicates otherwise.

A basic configuration of the handheld printer according to the present embodiment is described with reference to FIG. 1.

FIG. 1 is a perspective view illustrating an exterior of a handheld printer 1 according to the present embodiment, as viewed obliquely from above. The handheld printer 1 illustrated in FIG. 1 includes an upper unit 2 and a lower unit 3. The handheld printer 1 illustrated in FIG. 1 as a whole is shaped like a rectangular parallelepiped. The handheld printer 1 has such a width in a scanning direction (that is, a printing direction indicated by arrow x in FIG. 1) that a user can grasp with a palm.

The housing of the handheld printer 1 includes a recording side 30, an upper side 31 opposite the recording side 30, a left side 32 extending in a direction indicated by arrow y, orthogonal to the scanning direction (hereinafter "orthogonal direction y"), and the like. On the recording side 30, a recording section 41 (see FIG. 4) of an inkjet head 40 (see FIG. 3), serving as a recording device to be described later, faces a recording medium such as a sheet. The recording section 41 includes a plurality of ink discharge nozzles. The housing further includes, for example, a right side 33 extending in the orthogonal direction y orthogonal to the scanning direction (indicated by arrow x), a rear side 34 extending in the scanning direction, and a front side 35 extending in the scanning direction. When the orthogonal direction y is mentioned with respect to the recording medium, the orthogonal direction y is orthogonal to the scanning direction on the surface of the recording medium. When the orthogonal direction y is mentioned with respect to the handheld printer 1, the orthogonal direction y is orthogonal to the scanning direction on the recording side 30.

FIG. 1 illustrates the handheld printer 1 being in such a posture that the recording side 30 (i.e., a bottom face in FIG. 1) is faced vertically down and the upper side 31, which is opposite the recording side 30, is faced vertical up. A print button 14 and a power button 15 are disposed within an outer edge (within a frame) of the upper side 31. The left side 32 of the upper unit 2 includes a universal serial bus (USB) connection port 6.

The USB connection port 6 is a port for connecting a USB cable. The handheld printer 1 is provided with a rechargeable battery 51 (illustrated in FIG. 3) mounted therein. The rechargeable battery 51 can be charged when electric power is supplied thereto from an external power supply via the USB cable connected to the USB connection port 6.

An end of the lower unit 3 on the side of the front side 35 is a grip portion 36 greater in width than a rest of the lower unit 3. When the user moves the handheld printer 1 on a surface of the recording medium in the scanning direction (indicated by arrow x) for image formation, the user holds the grip portion 36 to move the handheld printer 1. The grip portion 36 is made wider in the scanning direction (indicated by arrow x) because the battery 51 is stored in the grip portion 36 as described later in addition to the convenience of the user in holding the handheld printer 1 with a hand.

Figure 2:
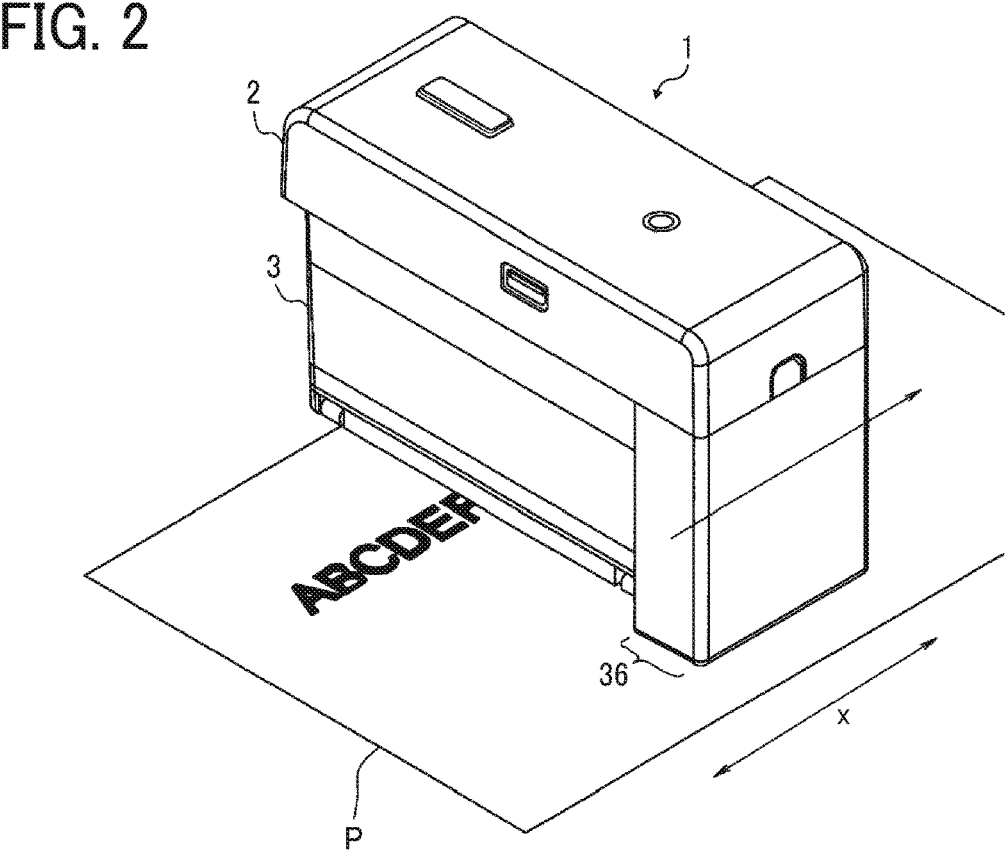
FIG. 2 is a perspective view illustrating the handheld printer being moved, together with a recording medium and a portion of an image immediately after formed.

The user can hold down the power button 15 for a while to switch on and off the power of the handheld printer 1. With the power turned on, a control board mounted in the upper unit 2 of the handheld printer 1 can acquire image information by Bluetooth (registered trademark) communication with, e.g., a smartphone. After the user places the handheld printer 1 on the surface of a recording medium P (see FIG. 2) with the recording side 30 facing the recording medium P, the user presses the print button 14 once and moves the handheld printer 1 in the scanning direction as illustrated in FIG. 2, thus forming an image on the recording medium P. The handheld printer 1 can form an image on the surface of the recording medium P both when the handheld printer 1 is moved forward in the scanning direction (indicated by arrow x) by the user and when the handheld printer 1 is moved backward in the scanning direction.

The recording medium is not limited to paper, such as paper sheets, but includes, for example, overhead projector (OHP) sheets, cloth, cardboards, packaging containers, glass, and substrates.

Figure 3:
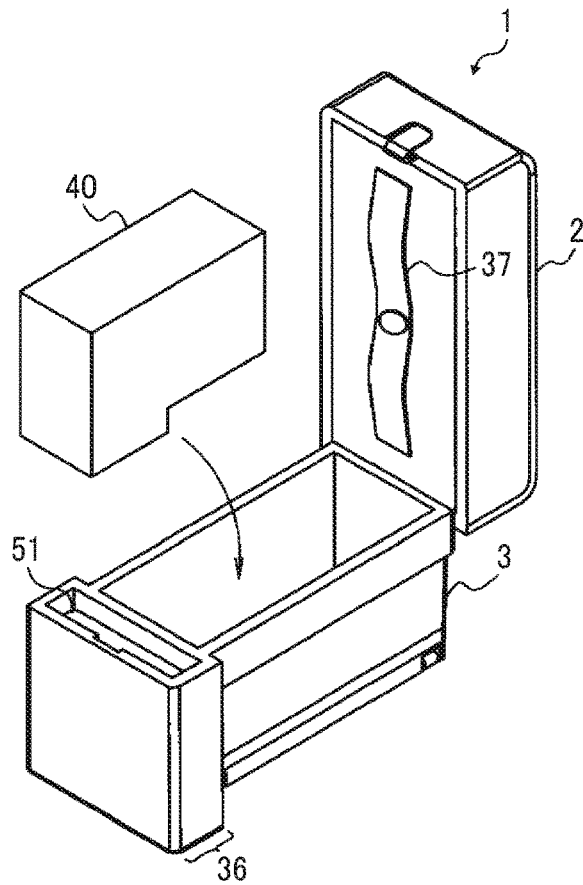
FIG. 3 is a perspective view of the handheld printer in a state in which an upper unit is opened with respect to a lower unit.

FIG. 3 is a perspective view of the handheld printer 1 in a state in which the upper unit 2 is opened with respect to the lower unit 3. As illustrated in FIG. 3, the upper unit 2 is held by the lower unit 3 to open and close with respect to the lower unit 3. The battery 51 to supply power to each device of the handheld printer 1 is housed in an inner space of the grip portion 36 of the lower unit 3.

The inkjet head 40 combined with an ink tank (an ink cartridge) is removably mounted in a portion of the lower unit 3 different from the grip portion 36. As illustrated in FIG. 3, the inkjet head 40, that is, the ink cartridge, includes the recording section 41 (see FIG. 4) and the ink tank combined into a single unit and is removable from the lower unit 3 of the handheld printer 1. At this time, the recording section 41 to discharge ink droplets is faced down in the vertical direction. The inkjet head 40 discharges ink droplets from the recording section 41 to record an image on a recording medium.

On the inner face of the upper unit 2, a head-pressing flat spring 37 to press and hold the inkjet head 40 mounted in the lower unit 3 is attached. For example, the head-pressing flat spring 37 is fixed thereto.

In the handheld printer 1, since the battery 51 is disposed on a side of the inkjet head 40 in the lower unit 3, the height of the handheld printer 1 is smaller compared with a configuration in which the battery 51 is disposed above the inkjet head 40. Such placement lowers the position of the center of gravity (gravity center position) of the handheld printer 1, thus preventing the handheld printer 1 from falling over while being moved.

The handheld printer 1 is designed to be compact in the scanning direction such that the size (apparatus width) of the handheld printer 1 is slightly wider than the inkjet head 40 in the scanning direction. As the apparatus width becomes larger, the range in which the handheld printer 1 can be moved in the scanning direction on the surface of the recording medium P becomes smaller, and the recordable range also becomes narrower. Reducing the apparatus width as much as possible can maximize the recordable range on the surface of the recording medium P.

Figure 4:
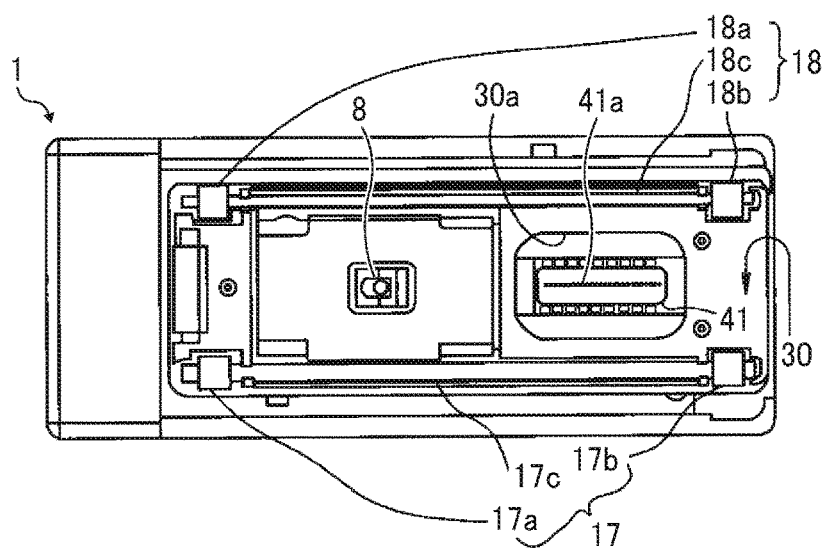
FIG. 4 is a bottom view of the handheld printer as viewed from a recording side.

FIG. 4 is a bottom view of the handheld printer 1 as viewed from the recording side 30. In FIG. 4, the recording side 30 of the handheld printer 1 includes an opening 30a to expose the recording section 41 of the inkjet head 40 mounted in the lower unit 3 (FIG. 3) to the outside. The recording section 41 includes a plurality of discharge nozzles 41a (e.g., orifices) and is capable of discharging ink droplets separately from the respective discharge nozzles 41a as piezoelectric elements are driven.

The recording section 41 is a region inside (on the side of the discharge nozzles 41a) a plurality of inner leads surrounding the discharge nozzles 41a along the surface of the substrate of the inkjet head 40. In the handheld printer 1, the area of the recording section 41 on the substrate is painted white to be clearly distinguished from the surrounding black area. In other words, the white area is a mark representing the recording section 41. The shape of the mark is rectangular as illustrated in the drawing.

As a driver for ink discharge, the inkjet head 40 employs, for example, piezoelectric actuators (laminated piezoelectric elements or thin-film piezoelectric elements) or electrostatic actuators including electrothermal transducer elements, such as heat elements, made of diaphragms and opposed electrodes.

The "liquid" discharged from the discharge nozzles 41a of the recording section 41 is not particularly limited as long as the liquid has a viscosity and a surface tension that can be discharged from the discharge nozzles 41a. However, it is preferable that the viscosity is 30 mPa·s or less under ordinary temperature and pressure or by heating or cooling. Specifically, the term "liquid" represents, for example, a solution, a suspension, or an emulsion including a solvent, such as water or organic solvent, a colorant, such as a dye or a pigment, a polymerizable compound, a resin, a functional material, such as a surfactant, a biocompatible material, such as deoxyribonucleic acid (DNA), amino acid, protein, or calcium, or an edible material, such as a natural colorant. Such a solution, a suspension, or an emulsion can be used for, e.g., inkjet ink, a surface treatment solution, liquid for forming components of electronic elements or light-emitting elements, liquid for forming resist patterns of electronic circuits, or a material solution for three-dimensional fabrication.

Disposed inside the outer edge of the recording side 30 are a position sensor 8 (a detector) to detect the position of the handheld printer 1 on the recording medium P, a left roller unit 17 including a first roller portion 17a and a second roller portion 17b, a right roller unit 18 including a first roller portion 18a and a second roller portion 18b. These roller portions are rotatable.

When the user moves the handheld printer 1 in the scanning direction, the four roller portions contacting the surface of the recording medium P rotate like tires. Owing to such roller portions, the user can advance the handheld printer 1 straight in the scanning direction. At this time, only the four roller portions of the handheld printer 1 are in contact with the surface of the recording medium P, and the recording side 30 is not in contact with the surface of the recording medium P. Therefore, a constant distance can be maintained between the recording section 41 of the inkjet head 40 and the surface of the recording medium P, thus forming a desired high-quality image.

The position sensor 8 is a sensor to detect the distance to the surface of the recording medium P, the surface state (for example, asperities) of the recording medium P, and the distance by which the handheld printer 1 has traveled. The position sensor 8 is similar to a sensor used for, for example, an optical mouse (a pointing device) of a personal computer. The position sensor 8 irradiates, with light, a place (recording medium) where the position sensor 8 is placed and reads the state of the place as a "pattern". The position sensor 8 sequentially detects how the "pattern" moves relative to the movement of the position sensor 8, to calculate the amount of movement.

Figure 5:
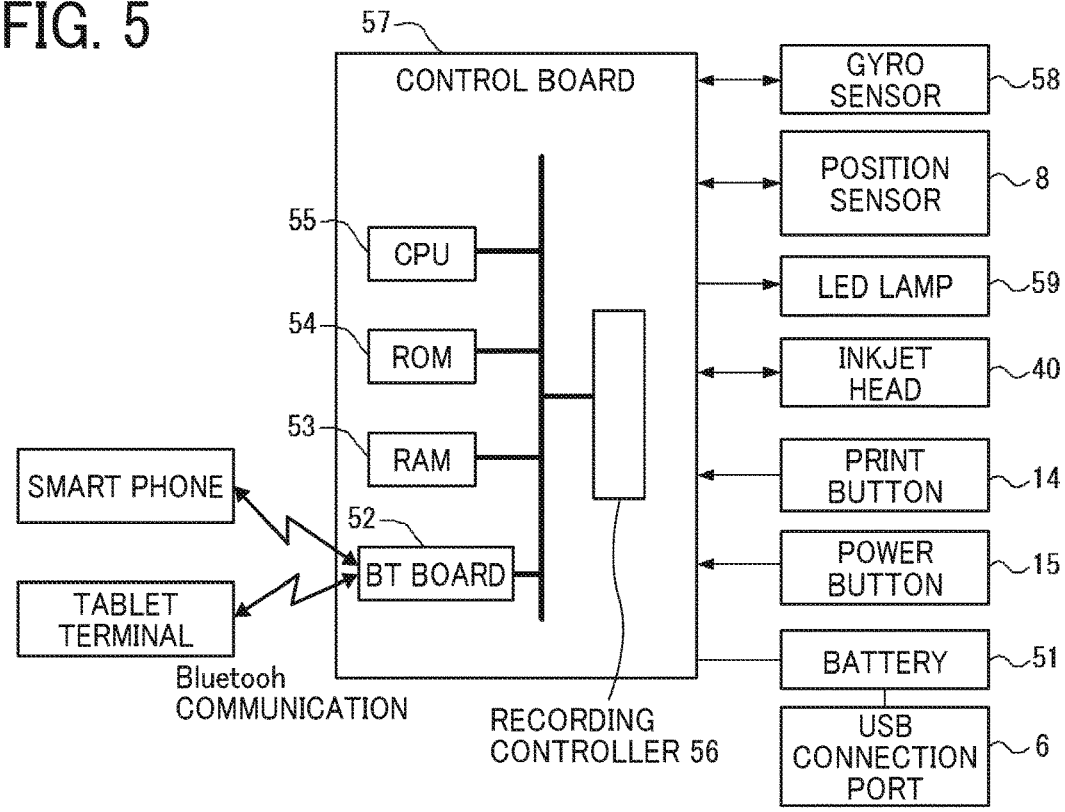
FIG. 5 is a block diagram illustrating a part of an electric circuit of the handheld printer, according to an embodiment.

FIG. 5 is a block diagram illustrating a portion of an electric circuit of the handheld printer 1.

A control board 57 includes a central processing unit (CPU) 55 that performs various arithmetic processing and program execution, a Bluetooth (registered trademark) board (Bt board) 52, a random access memory (RAM) 53 that temporarily stores data, a read-only memory (ROM) 54, and a recording controller 56. The control board 57 is secured at a position on the back side of the USB connection port 6 (illustrated in FIG. 1) in a hollow space of the upper unit 2 (illustrated in FIG. 1).

The Bt board 52 performs data communication by Bluetooth communication with an external device, such as a smartphone or a tablet terminal. The ROM 54 stores, for example, firmware for hardware control of the handheld printer 1 and drive waveform data of the inkjet head 40. The recording controller 56 executes data processing for driving the inkjet head 40 and generates drive waveforms.

To the control board 57, a gyro sensor 58, the position sensor 8, a light emitting diode (LED) lamp 59, the inkjet head 40, the print button 14, the power button 15, and the battery 51 are electrically connected.

The gyro sensor 58 detects the tilt and rotation angle of the handheld printer 1 and transmits the result of detection to the control board 57. The LED lamp 59 is disposed inside an exterior cover made of a light transmissive material of the print button 14 and makes the print button 14 luminous.

When the power button 15 is pressed to turn on the power of the handheld printer 1, power is supplied to each module. The CPU 55 initiates startup according to the program stored in the ROM 54 and develops the program and each data in the RAM 53. When data of image to be formed is received from an external device by Bluetooth communication, the recording controller 56 generates a drive waveform corresponding to the image data. The discharge of ink from the inkjet head 40 is controlled so as to form an image corresponding to the position on the surface of the recording medium P detected by the position sensor 8.

Figure 6:
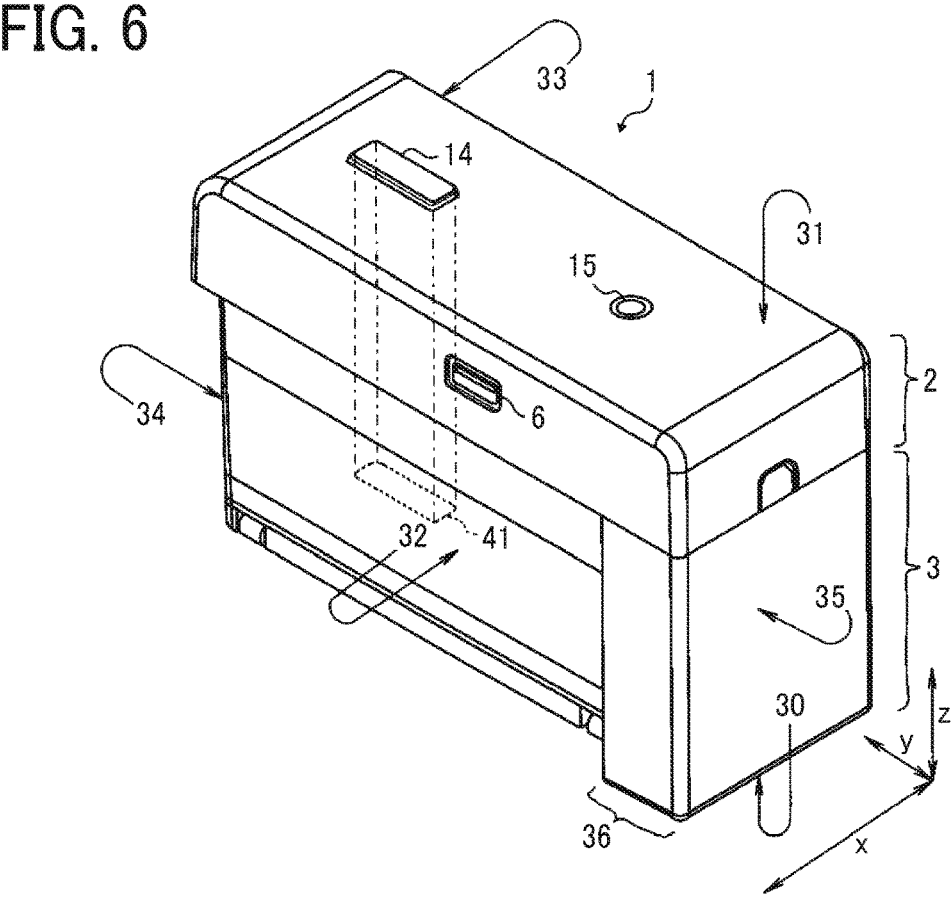
FIG. 6 is a perspective view illustrating relative positions between a print button of the handheld printer and a recording section.

FIG. 6 is a perspective view for explaining relative positions of the print button 14 of the handheld printer 1 and the recording section 41. In FIG. 6, the print button 14 is disposed within the plane of the upper side 31 being a face opposite the recording side 30. Further, the recording section 41 is disposed within the plane of the recording side 30. The print button 14 is disposed so that an image of the print button 14 projected in the direction (z-axis direction in FIG. 6) in which the recording side 30 opposes the upper side 31 overlaps the recording section 41. That is, the print button 14 is disposed directly above the recording section 41.

The planar shape and the planar size of the print button 14 are the same as the planar shape and planar size of the mark (indicated by broken line in the drawing) representing the recording section 41. The expression "the planar shape and the planar size are the same as" includes not only the case where the shapes and the sizes coincide exactly but also a case where some dimensional differences exist.

The print button 14 is used as a guide for indicating the position of recording by the recording section 41 to the user viewing the upper side 31 in addition to the button with which the user inputs a print instruction. Looking the upper side 31 of the handheld printer 1, the user can know the recording position in the scanning direction (indicated by arrow x) on the surface of the recording medium P and the recording position in the orthogonal direction y orthogonal to the scanning direction.

Figure 7:
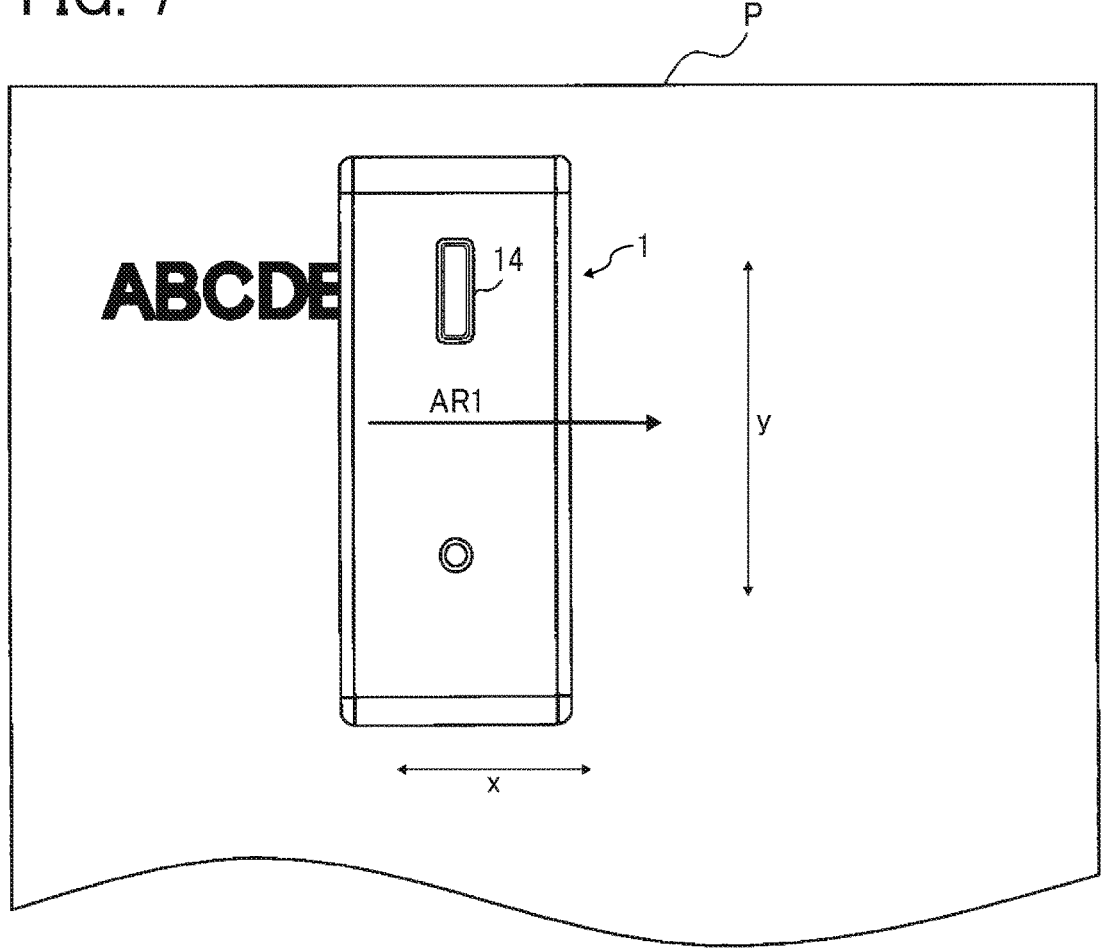
FIG. 7 is a plan view illustrating the handheld printer forming an image on a recording medium, together with the recording medium and an image portion immediately after formed.

FIG. 7 is a plan view illustrating the handheld printer 1 forming an image on the recording medium P, together with the recording medium P and the image portion immediately after formed. The user moves the handheld printer 1 placed on the surface of the recording medium P in the direction indicated by arrow AR1 in FIG. 7 to cause the handheld printer 1 to execute the image formation. At this time, the line of sight looking at the print button 14 as the guide is at an angle looking straight down the handheld printer 1 as illustrated in FIG. 7. Then, the left-hand side and the right-hand side of the recording medium P can be visually recognized easily. Accordingly, the position of the handheld printer 1 can be easily kept to such a position that the longitudinal direction of the handheld printer 1 (the orthogonal direction y in the figure) parallels the left side or the right side of the recording medium P. Therefore, the image can be easily formed straight along the lateral direction or the longitudinal direction of the recording medium P.

When the print button 14 used for inputting the print instruction serves as the guide, the following advantage is attained. When the user presses the print button 14 to start printing, the user recognizes, visually and with tactile sensation, the position of recording by the recording section 41. Thus, the user can easily grasp the recording position.

In response to acquisition of image data via Bluetooth communication from an external device, the control board 57 illustrated in FIG. 5 causes the LED lamp 59 to blink so that the print button 14, which transmits light, becomes luminous and blinks. Seeing such blinking, the user knows that the acquisition of the image data of handheld printer 1 has ended. Then, the user places the handheld printer 1 on the recording medium P and presses the print button 14.

Figure 8:
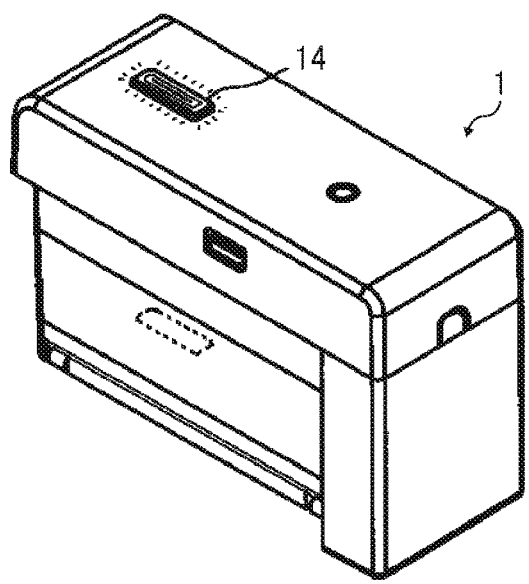
FIG. 8 is a perspective view illustrating the handheld printer with a print button emitting light.

Meanwhile, as the control board 57 starts blinking of the LED lamp 59, the control board 57 waits for pressing of the print button 14. When the print button 14 is pressed, the control board 57 causes the LED lamp 59 to keep emitting light so that the print button 14 continuously emit light as illustrated in FIG. 8. Seeing the continuous light emission, the user starts moving the handheld printer 1 in the scanning direction. At this time, the print button 14 continuously emitting light helps the user to grasp the recording position.

Finishing moving of the handheld printer 1, the user picks up the handheld printer 1 from the recording medium P and places the handheld printer 1 on a table or the like. When the handheld printer 1 is picked up from the recording medium P, the position sensor 8 does not detect the position. At the timing when the position sensor 8 no longer detects the position, the control board 57 turns off the LED lamp 59 and stops lighting of the print button 14. Seeing the stop of lighting, the user can know that the operation of the handheld printer 1 for printing has ended.

It is not necessary to keep pushing the print button 14 while the user moves the handheld printer 1. Once the print button 14 is pushed and released before the moving of the handheld printer 1, the image forming operation based on the detection result by the position sensor 8 is continued until the end of the image formation or end of the position detection by the position sensor 8.

In a case of a mobile printer provided with a roller (or rollers), during scanning by the printer, the roller rotates, like a wheel, while being in contact with the recording medium. Two rollers may be respectively disposed at both ends in the printer width direction orthogonal to the scanning direction. The printer may rattle in the axial direction of the roller while being moved. Such rattling can disturb the image formed by the printer.

Descriptions are given below of a feature of the handheld printer 1 according to the present embodiment.

Figure 9:
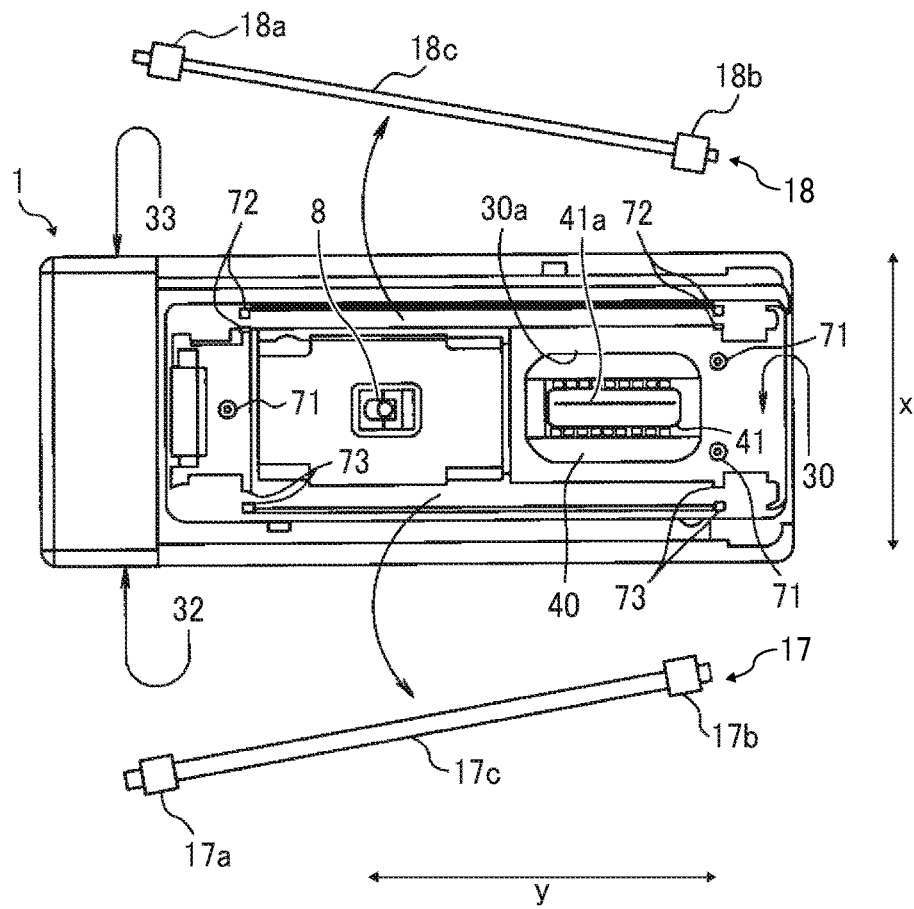
FIG. 9 is a bottom view illustrating the handheld printer with left and right roller units removed therefrom.

FIG. 9 is a bottom view illustrating the handheld printer 1 with the left roller unit 17 and the right roller unit 18 separated therefrom. The handheld printer 1 includes the left roller unit 17 and the right roller unit 18. The left roller unit 17 is attached to an end on the left side 32 in the scanning direction (indicated by arrow x) of the handheld printer 1. The right roller unit 18 is attached to an end on the right side 33 in the scanning direction of the handheld printer 1.

The left roller unit 17 includes a metal shaft 17c, the first roller portion 17a secured to one end side in the longitudinal direction of the shaft 17c, and the second roller portion 17b secured to the other end side of the shaft 17c. Each of the first roller portion 17a and the second roller portion 17b is made of a material, such as rubber, having a relatively large frictional resistance.

The right roller unit 18 includes a metal shaft 18c, the first roller portion 18a secured to one end side in the longitudinal direction of the shaft 18c, and the second roller portion 18b secured to the other end side of the shaft 18c. Each of the first roller portion 18a and the second roller portion 18b is made of a material, such as rubber, having a relatively large frictional resistance.

As end portions in the longitudinal direction of the shaft 17c are fitted in sliding bearings 73 fixed to the handheld printer 1, the left roller unit 17 is rotatably held by the sliding bearings 73. The sliding bearing 73 includes a cutout portion in the circumferential direction, and the shaft 17c is inserted into the bearing through the cutout portion. At this time, the sliding bearing 73 is temporarily deformed by the force pushing in the shaft 17c so that the width of the cutout portion, which is smaller than the diameter of the shaft 17c in a normal state, is expanded to be approximately equal to the diameter of the shaft 17c. When the shaft 17c is fully pushed in the sliding bearing 73, the deformation of the sliding bearing 73 is canceled, and the width of the cutout portion becomes smaller than the diameter of the shaft 17c. As a result, the left roller unit 17 is rotatably held by the sliding bearing 73.

Similar to the left roller unit 17 described above, the right roller unit 18 is rotatably held by sliding bearings 72 fixed to the handheld printer 1.

The left roller unit 17 and the right roller unit 18 are for enhancing the straight traveling performance of the handheld printer 1 in the scanning direction (indicated by arrow x). While the first roller portion 17a and the second roller portion 17b secured (for example, fixed) to the shaft 17c rotate together as one unit, the first roller portion 18a and the second roller portion 18b secured to the shaft 18c rotate together as one unit, thus improving the straight traveling performance.

More specifically, the first roller portion 17a and the second roller portion 17b of the left roller unit 17 rotate as one unit on the same axis. Such a structure can prevent the first and second roller portions 17a and 17b from rotating at different linear speeds and rotating in the opposite directions from each other. Assume that a force in a direction deviating from the scanning direction, in addition to the force in the scanning direction, is applied to the handheld printer 1 while the user moves the handheld printer 1 provided with the left roller unit 17 in the scanning direction. The latter force (the force in the direction deviating from the scanning direction) urges the first and second roller portions 17a and 17b to rotate at different linear speeds or to rotate relative to each other. However, the two roller portions rotating as one unit do not rotate in such a manner. Since the two roller portions rotate in the same direction and at the same linear speed, the handheld printer 1 follows the force in the scanning direction and travels straight in the scanning direction. Therefore, the user can easily move the handheld printer 1 straight in the scanning direction.

Although the description above concerns how the left roller unit 17 enhances the straight traveling performance of the handheld printer 1, the right roller unit 18 enhances the straight traveling performance of the handheld printer 1 similarly. Even if the first and second roller portions 17a and 17b (or 18a and 18b) of each of the left roller unit 17 and the right roller unit 18 (hereinafter also collectively "roller units 17 and 18") are rotated independently of each other, the straight traveling performance can be improved to some extent by the roller portions. Hereinafter the first and second roller portions 17a and 17b and the first and second roller portions 18a and 18b may be collectively referred to as "roller portions 17a, 17b, 18a, and 18b" when discriminations therebetween is not necessary. Therefore, rotating the two roller portions 17a and 17b (or 18a and 18b) together as one unit is not a requisite, and the two roller portions can be rotated independently of each other. However, rotating two roller portions as one unit is advantageous in better improving the straight traveling performance.

In the handheld printer 1, the two roller portions 17a and 17b of the left roller unit 17 and the two roller portions 18a and 18b of the right roller unit 18 are disposed at positions deviating from the recording section 41 (the opening 30a illustrated in FIG. 9) in the orthogonal direction y to the scanning direction. Specifically, each of the four roller portions 17a, 17b, 18a, and 18b are disposed as follows. A projected image of the recording section 41 projected in the opposing direction (z-axis direction in FIG. 6) between the recording section 41 (placed on the recording medium P) and the recording medium P does not overlap with a projected image of the roller portion projected in the scanning direction. In such an arrangement, when the handheld printer 1, which can scan the recording medium P reciprocally, is moved forward, the first and second roller portions 17a and 17b of the left roller unit 17 are inhibited from contacting an image portion immediately after formed. In addition, when the handheld printer 1 is moved backward, the first and second roller portions 18a and 18b of the right roller unit 18 are inhibited from contacting an image portion immediately after formed. Therefore, the image can be protected from being disturbed by the roller portions 17a, 17b, 18a, and 18b contacting the image portion immediately after formed.

As the distance between the two roller portions (17a and 17b, and 18a and 18b) in the rotation axis direction increases, the roller units 17 and 18 can enhance the straight traveling performance of the handheld printer 1. Therefore, in the handheld printer 1, the first roller portions 17a and 18a are disposed at a position deviated from the recording section 41 toward the one end side (to the front side 35) in the orthogonal direction y to the scanning direction. In addition, the second roller portions 17b and 18b are disposed at a position deviated from the recording section 41 to the other end side (to the rear side 34). In such a structure, compared with a structure in which two roller portions are disposed together at one end side or the other end side, the distance in the direction between the two roller portions in the direction orthogonal to the scanning direction is greater, thereby improving the straight traveling performance of the handheld printer 1.

As described above, the shafts 17c and 18c of the roller units 17 and 18 are made of metal. Compared with a structure using a nonmetallic shaft, use of the metal shaft is advantageous in suppressing bend of the shaft during moving of the handheld printer 1, thereby inhibiting the image from being disturbed by unstable traveling of the handheld printer 1 due to the flexure of the shaft. Further, the handheld printer 1 can be compact when a shaft having a small diameter is used.

The handheld printer 1 includes, not only the left roller unit 17, but also the right roller unit 18 disposed on the side of the left roller unit 17 in the scanning direction. In such a configuration, the two roller units 17 and 18 resist the forces deviating from the scanning direction at different positions in the scanning direction. Accordingly, the straight traveling performance of the handheld printer 1 can be further enhanced.

Figure 10:
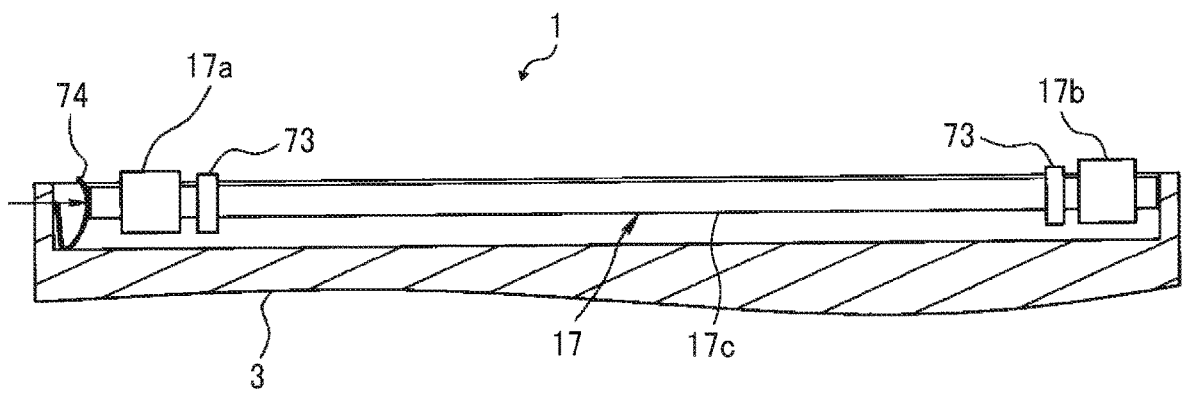
FIG. 10 is a partial cross-sectional view of the lower unit of the handheld printer, with the left roller unit attached thereto.

FIG. 10 is a partial cross-sectional view of the lower unit 3 of the handheld printer 1, with the left roller unit 17 attached thereto. In the figure, the lower unit 3 is illustrated with the recording side 30 (illustrated in FIG. 9) facing up. A pressing flat spring 74 is attached to a wall of the lower unit 3. For example, the pressing flat spring 74 is fixed thereto. The pressing flat spring 74 presses one longitudinal end of the shaft 17c of the left roller unit 17 toward the other end side in the axial direction so that the other longitudinal end of the shaft 17c is pressed against an inner wall of the casing of the lower unit 3.

In this manner, the shaft 17c of the left roller unit 17 is pressed in the axial direction by the pressing flat spring 74 to suppress the backlash of the first roller portion 17a and the second roller portion 17b in the axial direction (eliminate space allowing backlash). Giving attention to the left roller unit 17, the left roller unit 17 rattles in the axial direction relative to the casing of the handheld printer 1, but the casing rattles relative to the left roller unit 17 during the moving of the handheld printer 1. Specifically, the casing is the casing of the upper unit 2 or the casing of the lower unit 3. The recording section 41 is secured at position inside the casing of the lower unit 3. Accordingly, the image is disturbed if the casing of the lower unit 3 rattles during the moving of the handheld printer 1. Pressing the shaft 17c in the axial direction with the pressing flat spring 74 can inhibit rattling of the casing of the lower unit 3 during the moving of the handheld printer 1 and image disturbance due to the rattling.

Although the description above concerns the pressing flat spring 74 (a pressing member) that presses the shaft 17c of the left roller unit 17 in the axial direction, the shaft 18c of the right roller unit 18 is similarly pressed in the axial direction by another pressing flat spring 74.

Alternatively, the first and second roller portions 17a and 17b (or one of the first and second roller portions 17a and 17b) can be pressed, instead of pressing the shaft 17c by the pressing flat spring 74. In the case of a roller consisting of a roller portion without a shaft, the roller portion can be pressed with a pressing member. Examples of the pressing member is not limited to flat springs but include other types of springs, such as coil springs, and elastic members such as a rubber body.

Figure 11:
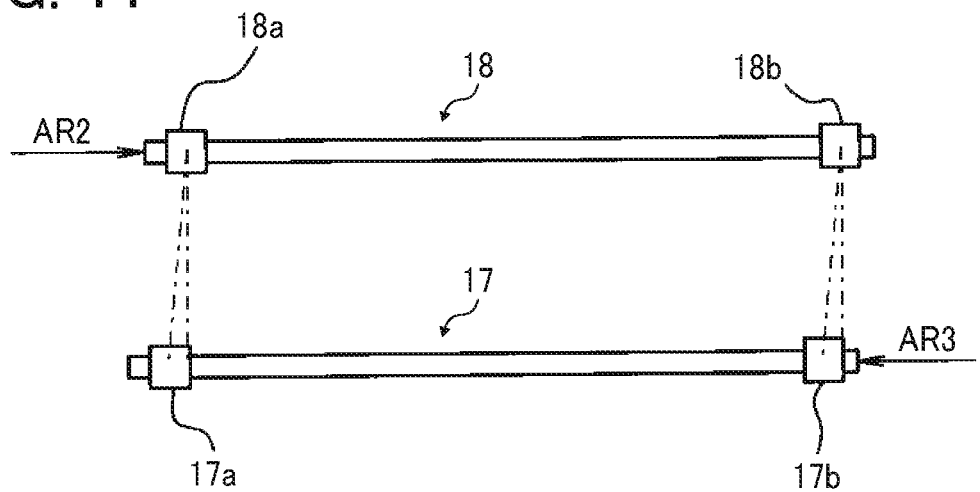
FIG. 11 is a schematic view illustrating the position of each roller portion of the left and right roller units illustrated in FIG. 10, in an example in which the direction in which a pressing flat spring presses the left roller unit is opposite the direction in which the pressing flat spring presses the right roller unit.

FIG. 11 is a schematic view illustrating the position of each roller portion in an example in which the direction in which the pressing flat spring 74 presses the left roller unit 17 is opposite the direction in which the other pressing flat spring 74 (see FIG. 10) presses the right roller unit 18.

In FIG. 11, arrows AR2 and AR3 indicate pressing directions by the pressing flat springs 74 illustrated in FIG. 10. As illustrated in the drawing, when the pressing directions of the two pressing flat springs 74 are opposite to each other, the direction in which the left roller unit 17 is pressed against the casing to eliminate backlash is opposite the direction in which the right roller unit 18 is pressed against the casing to eliminate backlash. As a result, the first roller portion 17a of the left roller unit 17 undesirably deviates in the axial direction from the first roller portion 18a of the right roller unit 18. Likewise, the second roller portion 17b of the left roller unit 17 undesirably deviates in the axial direction from the second roller portion 18b of the right roller unit 18. As a result, the straight traveling performance of the handheld printer 1 is lowered.

Therefore, in the handheld printer 1, the respective pressing flat springs 74 for the left roller unit 17 and the right roller unit 18 are disposed such that the direction in which the pressing flat spring 74 presses the shaft 17c of the left roller unit 17 is the same as the direction in which the pressing flat spring 74 presses the shaft 18c of the right roller unit 18.

Figure 12:
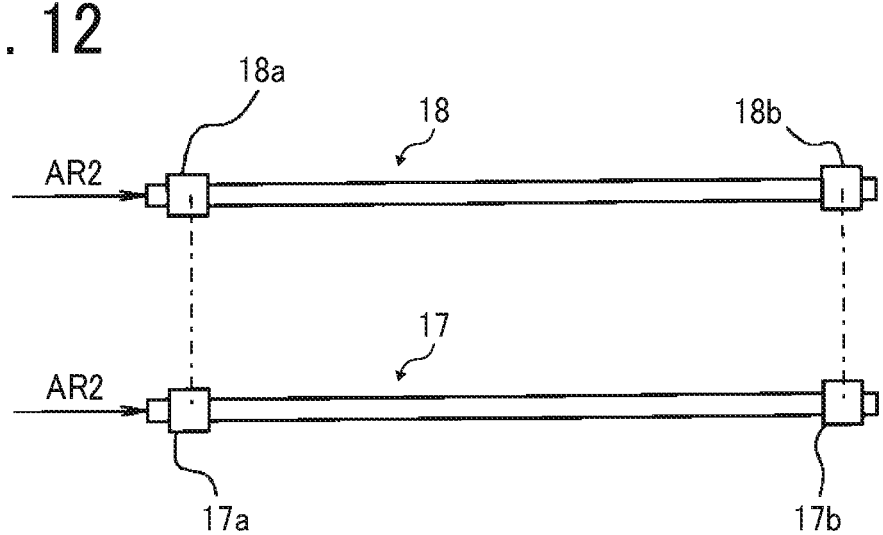
FIG. 12 is a schematic view illustrating positions of the roller portions illustrated in FIG. 11, in the handheld printer.

With such a configuration, as illustrated in FIG. 12, the roller portions 17a and 17b of the left roller unit 17 and the roller portions 18a and 18b of the right roller unit 18 are set at approximately the same positions in the axial direction. This configuration can suppress the deterioration of the straight traveling performance of the handheld printer 1 caused by differences in the positions of the roller portions between the roller units.

The pressing direction of the pressing flat springs 74 is from the grip portion 36 (illustrated in FIG. 1) toward the opposite side in the axial direction. That is, the pressing flat springs 74 are attached at positions closer to the grip portion 36 than the roller units 17 and 18. Such placement can inhibit the deterioration of the straight traveling performance of the handheld printer 1 when the user moves the handheld printer 1 with an elbow placed on a desk.

Specifically, when the user grabbing the grip portion 36 places his or her elbow on the desk, the user is likely to move the handheld printer 1 in a curved track with the elbow serving as a fulcrum. At this time, when rattling of the roller units 17 and 18 is permitted, the shaft 17c or 18c of the roller unit 17 or 18 is brought into contact with the casing wall on the side opposite the grip portion 36 in the axial direction. Even in the structure in which the rattling of the roller unit is suppressed by the pressing force of a pressing flat spring, if the pressing force is in the direction toward the grip portion, it is possible that the roller unit moves to the side opposite the grip portion overcoming the applied pressure. Therefore, the pressing force is applied from the grip portion side to the opposite side. This structure can eliminate a margin for the roller unit to move to the side opposite the grip portion side and accordingly suppress the deterioration of the straight traveling performance of the handheld printer 1 when the user moves the handheld printer 1 with an elbow placed on a desk.

Instead of attaching the pressing flat spring to the casing, the pressing flat spring can be attached to the end portion of the shaft 17c (or 18c) of the roller unit 17 (or 18). The pressing flat spring can be fixed thereto. Such a configuration can obviate a process of attaching the pressing flat spring to the casing, thereby reducing the cost for assembling.

Figure 13:
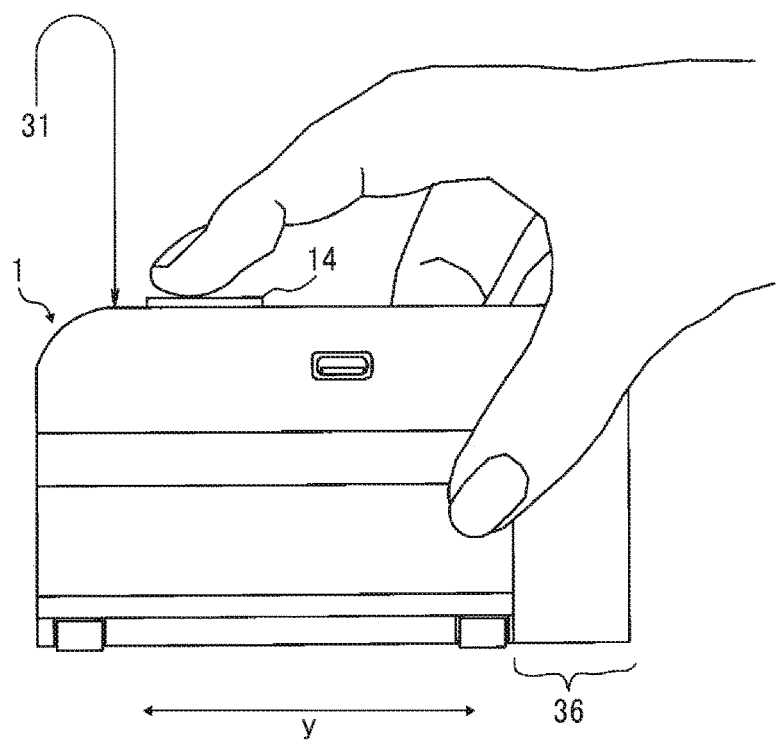
FIG. 13 is a side view illustrating a hand of a user moving the handheld printer.

FIG. 13 is a side view illustrating a hand of the user moving the handheld printer 1. In the handheld printer 1, the grip portion 36 gripped by the user is positioned on one end side in the orthogonal direction y orthogonal to the scanning direction of the body of the handheld printer 1. Further, the print button 14, which is an operation device operated for the operation of the recording section 41 (see FIG. 9), is disposed on the other end side (opposite the grip portion 36) of the upper side 31 in the orthogonal direction y to the scanning direction. That is, in the direction orthogonal to the scanning direction, the grip portion 36 and the print button 14 are on the opposite sides.

With such placement, before moving the handheld printer 1, the user can press the print button 14 with his or her index finger, holding the handheld printer 1 with his or her thumb hooked on the grip portion 36 of the handheld printer 1. In this state, the user can naturally float his or her wrist in the air. Such placement can prevent the following inconvenience. If the user moves the handheld printer 1 with the wrist rested on the desk, there is a risk that the direction of movement of the handheld printer 1 is deviated from a linear track by the movement of the hand centered on the wrist being a fulcrum about which the hand rotates.

As described above, since the handheld printer 1 includes the roller units 17 and 18 each configured to rotate the two roller portions (17a and 17b or 18a and 18b) as one unit, the straight traveling performance in the scanning direction of the handheld printer 1 can be improved. However, in some cases, the user desires to move the handheld printer 1 along a curved track. In this case, the roller units may obstruct the moving of the handheld printer 1 along the curved track.

Therefore, in the handheld printer 1, as illustrated in FIG. 9, the shafts 17c and 18c of the roller units 17 and 18 are respectively held by the sliding bearings 73 and 72 so that the shafts 17c and 18c are rotatable relative to and removable from the sliding bearings 73 and 72, respectively. As a result, the user can switch state of the handheld printer 1 in moving the handheld printer 1 to form an image on the recording medium P, as follows. That is, the user can switch the state of the handheld printer 1 between a roller contact state and a roller contactless state. In the roller contact state, the two roller portions (17a and 17b or 18a and 18b) in each of the roller units 17 and 18 are in contact with the recording medium P. In the roller contactless state, the roller portions do not contact the recording medium P. When the roller units 17 and 18 are removed from the sliding bearings 73 and 72, respectively, the handheld printer 1 becomes the roller contactless state.

On the recording side 30, three projections 71 (see FIG. 9) are provided to support the body of the handheld printer 1 at three positions. The projections 71 are made of plastic or the like. Respective tips of the projections 71 are positioned closer to the recording side 30 than the contact position between the roller portions 17a, 17b, 18a, and 18b and the recording medium P in the above-described roller contact state. Therefore, the projections 71 do not contact the recording medium P in the roller contact state. By contrast, in the roller contactless state, the projections 71 contact the recording medium P and float the recording side 30 of the handheld printer 1 in the air. Thus, the image can be protected from being disturbed by the recording side 30 rubbing against the image portion immediately after formed during image formation in the roller contactless state.

Each of the three projections 71 is disposed out of the range of the recording section 41 (the opening 30a of the recording side 30) in the orthogonal direction y to the scanning direction. More specifically, each of the three projections 71 is disposed such that the projection image of the projection 71 projected in the scanning direction (indicated by arrow x) does not overlap the projection image of the recording section 41 projected in the opposing direction of the recording section 41 and the recording medium P.

With such placement, the image can be protected from being disturbed by the projections 71 rubbing against the image portion immediately after formed during image formation in the roller contactless state.

Figure 14:
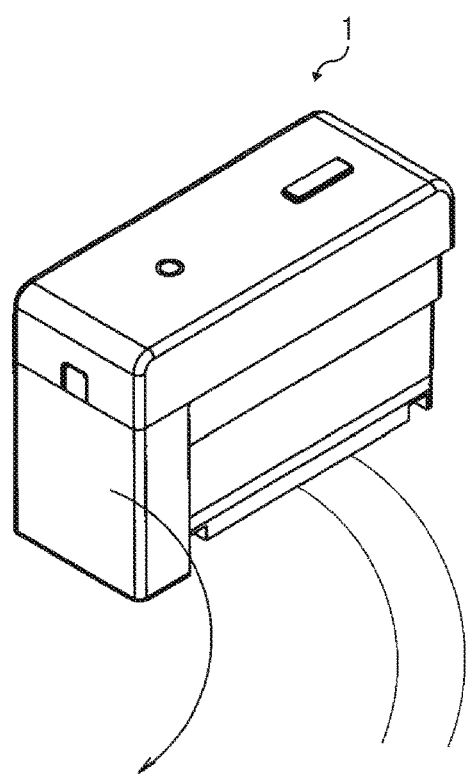
FIG. 14 is a perspective view illustrating the handheld printer being moved along a curved track in a roller contactless state.

FIG. 14 is a perspective view illustrating the handheld printer 1 being moved along a curved track in the roller contactless state. In the roller contactless state, since the handheld printer 1 is supported at three positions by the three projections 71, the curved traveling performance of the handheld printer 1 is improved, compared with the roller contact state. Therefore, the handheld printer 1 can be easily moved along the curved track.

Next, descriptions are given below of variations in which a portion of the above-described handheld printer 1 is changed. Other than the differences described below, the structure of the handheld printer 1 is similar to the structure in the above-described embodiment.

Variation 1

In the handheld printer 1 according to the above-described embodiment, the sliding bearings 73 and 72 are adopted for switching the state of the handheld printer 1 between the roller contact state and the roller contactless state. Alternatively, in Variation 1, a spacer is adopted.

Figure 15:
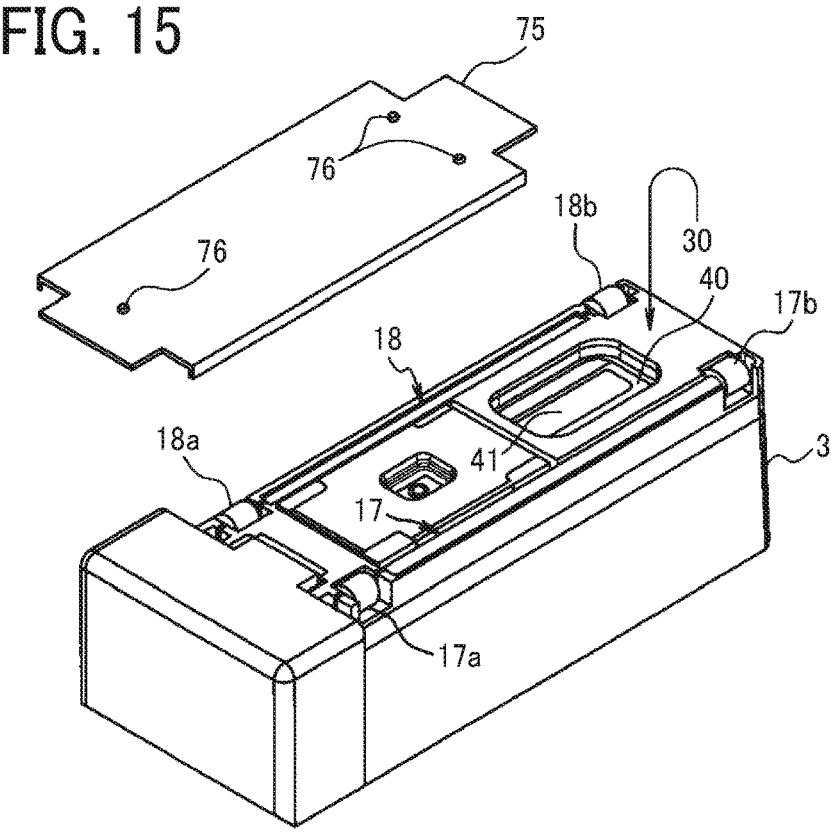
FIG. 15 is a perspective view illustrating a lower unit of a handheld printer and a spacer as viewed from the recording side, according to Variation 1.

FIG. 15 is a perspective view illustrating the lower unit 3 of the handheld printer 1 and a spacer 75 as viewed from the recording side 30. The spacer 75 is attached to and removed from the recording side 30 of the lower unit 3 with a magnet.

Figure 16:
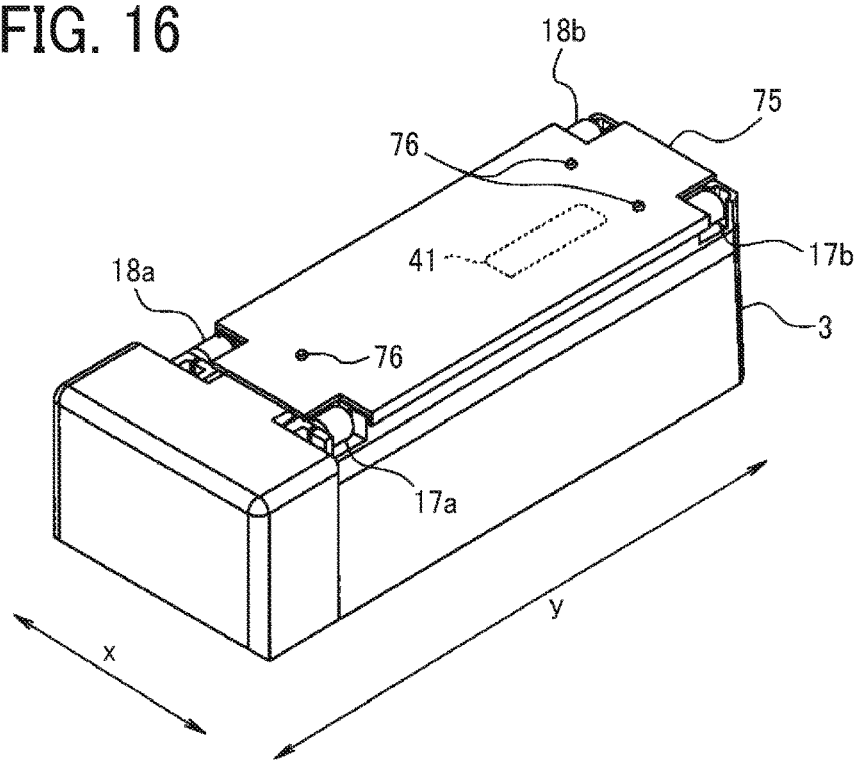
FIG. 16 is a perspective view illustrating the lower unit in a state in which the spacer is mounted, according to Variation 1.

FIG. 16 is a perspective view illustrating the lower unit 3 in a state in which the spacer 75 is mounted. Three projections 76 for supporting the handheld printer 1 at three positions project from the surface of the spacer 75. In the state where the spacer 75 is mounted on the recording side 30 (illustrated in FIG. 15) of the lower unit 3, the tips of the projections 76 are farther from the recording side 30 than the surfaces of the roller portions 17a, 17b, 18a, and 18b. Therefore, when the handheld printer 1 is placed on the recording medium P, the tips of the projections 76 are interposed between the recording side 30 and the recording medium P to float the roller portions 17a, 17b, 18a, and 18b from the surface of the recording medium P. As a result, a roller contactless state is realized.

Each of the three projections 76 is disposed out of the range of the recording section 41 in the orthogonal direction y to the scanning direction. More specifically, each of the three projections 76 is disposed such that the projection image of the projection 76 projected in the scanning direction (indicated by arrow x) does not overlap the projection image of the recording section 41 projected in the opposing direction of the recording section 41 and the recording medium P.

With such placement, the image can be protected from being disturbed by the projections 76 rubbing against the image portion immediately after formed during image formation in the roller contactless state.

In the above-described embodiment, the state of the handheld printer 1 is switched by attaching and removing the two roller units 17 and 18. Alternatively, in Variation 1, the state of the handheld printer 1 is switched by attaching and removing the spacer 75 only. Therefore, switching of the state can be easier compared with the above-described embodiment. By contrast, the above-described embodiment is advantageous in that, switching of the state is realized without increasing the number of parts (sliding bearings are necessary irrespective of switching of the state), thereby reducing the cost.

Variation 2

Figure 17:
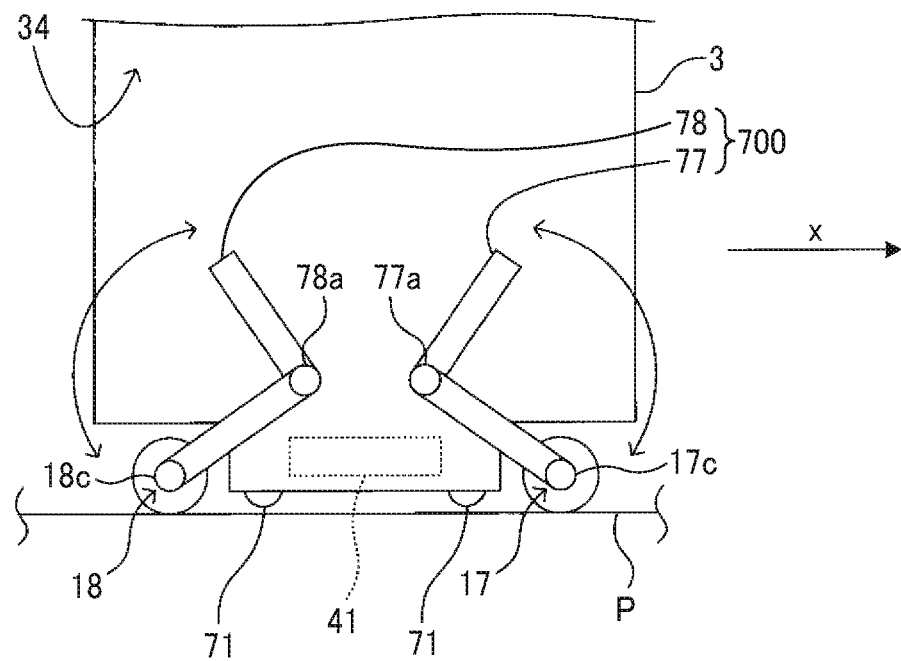
FIG. 17 is a partial rear view illustrating a lower unit of a handheld printer according to Variation 2.

FIG. 17 is a partial rear view illustrating the lower unit 3 of the handheld printer 1 according to Variation 2. On the rear side 34 of the lower unit 3, a roller unit moving mechanism 700 (a roller moving device) is provided. The roller unit moving mechanism 700 to move the roller units 17 and 18 includes refracting arms 77 and 78, arm locking members, and the like. The refracting arms 77 and 78 are coupled to the shafts 17c and 18c, respectively. As the refracting arms 77 and 78 are rotated about rotation shafts 77a and 78a, respectively, the roller units 17 and 18 can be moved between a first position to contact the recording medium P and a second position contactless with the recording medium P. After the movement, the rotation of the refracting arms 77 and 78 is locked by the arm locking members, thereby also locking the movement of the roller units 17 and 18.

In FIG. 17, the lower unit 3 is in the roller contact state. When the refracting arms 77 and 78 (levers) are rotated to bring the roller portions 17a, 17b, 18a, and 18b of the roller units 17 and 18 closer to the upper side 31 (see FIG. 13), the roller units 17 and 18 can be separated from the recording medium P into the roller contactless state.

Such a configuration enables switching of the state of the handheld printer 1 while preventing the removable roller units 17 and 18 and the spacer 75 from being lost.

Variation 3

Figure 18:
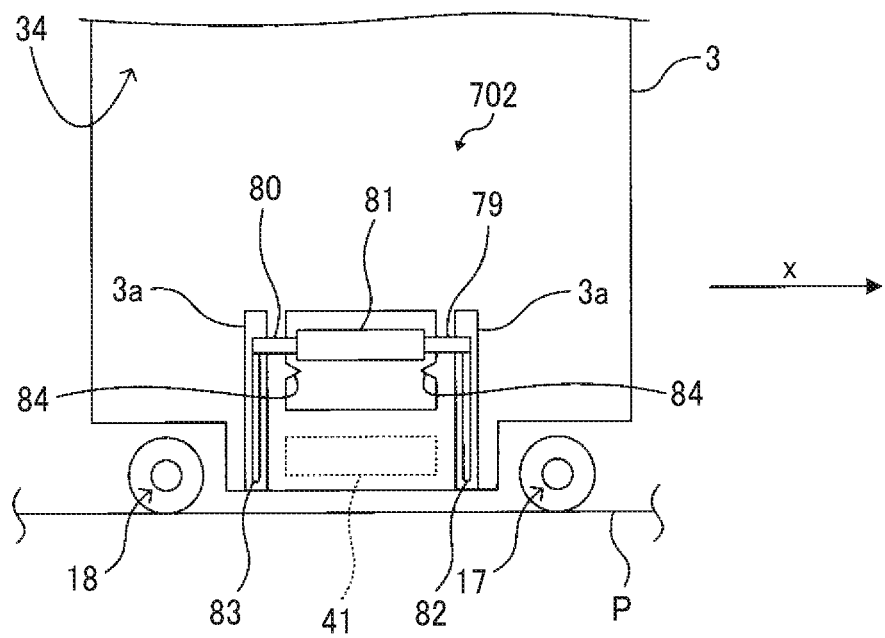
FIG. 18 is a partial rear view illustrating a lower unit of a handheld printer according to Variation 3.

FIG. 18 is a partial rear view illustrating the lower unit 3 of the handheld printer 1 according to Variation 3. On the rear side 34 of the lower unit 3, a pin moving mechanism 702 (a support moving device) is provided. The pin moving mechanism 702 includes retractable pins 82 and 83 as supports, grooves 3a and 3b in the casing so as to accommodate the pins 82 and 83, arms 79 and 80 to which the pins 82 and 83 are fixed, a handle 81 for operating the arms 79 and 80, and the like.

As the handle 81 is moved up and down, the pins 82 and 83 move up and down between a first position closer to recording medium P than the roller units 17 and 18 and a second position farther from the recording medium P than the roller units 17 and 18. In FIG. 18, the lower unit 3 is in the roller contact state. Although it looks as if the roller 17 and 18 are separated from the lower unit 3 in the partial view of FIG. 18, the roller units 17 and 18 are rotatably supported by bearings provided to the lower unit 3. As the handle 81 is moved to the position of a hooking claw 84 and hooked on the hooking claw 84, the pins 82 and 83 become closer to the recording medium P than the roller units 17 and 18 and lift the handheld printer 1. As a result, the roller units 17 and 18 are separated from the recording medium P, and the handheld printer 1 is in the roller contactless state.

Such a configuration enables switching of the state of the handheld printer 1 while preventing the removable roller units 17 and 18 and the spacer 75 from being lost.

Variation 4

Figure 19:
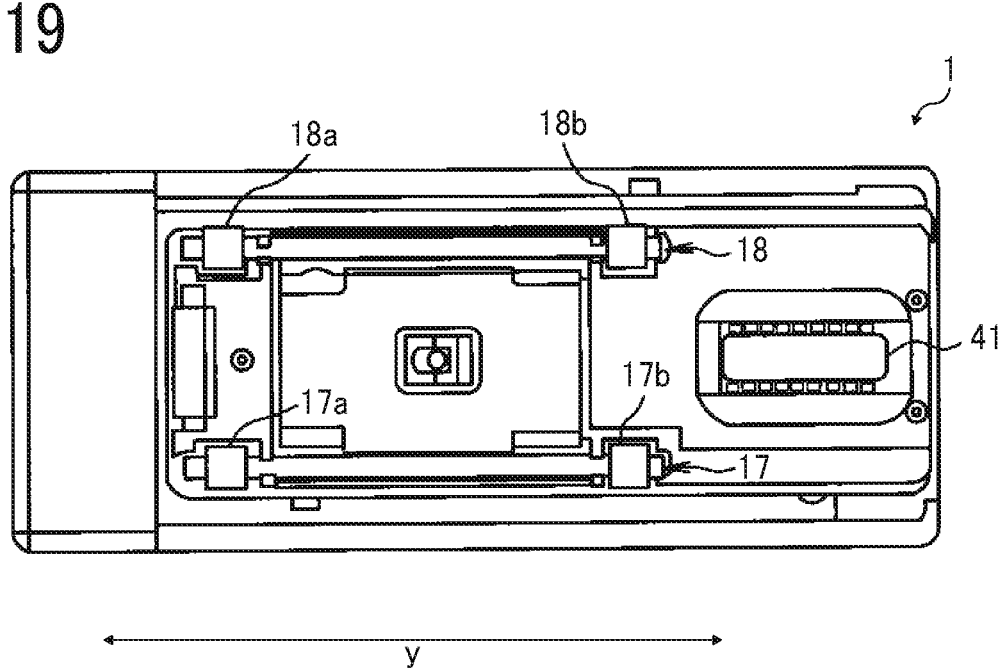
FIG. 19 is a bottom view illustrating a handheld printer according to Variation 4.

FIG. 19 is a bottom view illustrating the handheld printer 1 according to Variation 4. In the handheld printer 1 illustrated in FIG. 19, the two roller portions 17a and 17b of the left roller unit 17 are deviated from the recording section 41 toward one end (e.g., left side in FIG. 19) of the handheld printer 1 in the orthogonal direction y to the scanning direction. Likewise, the two roller portions 18a and 18b of the right roller unit 18 are deviated from the recording section 41 to the same side on which the two roller portions 17a and 17b are disposed.

Such placement meets a layout constraint inhibiting the roller portion from being disposed at an end in the orthogonal direction y to the scanning direction.

Variation 5

Figure 20:
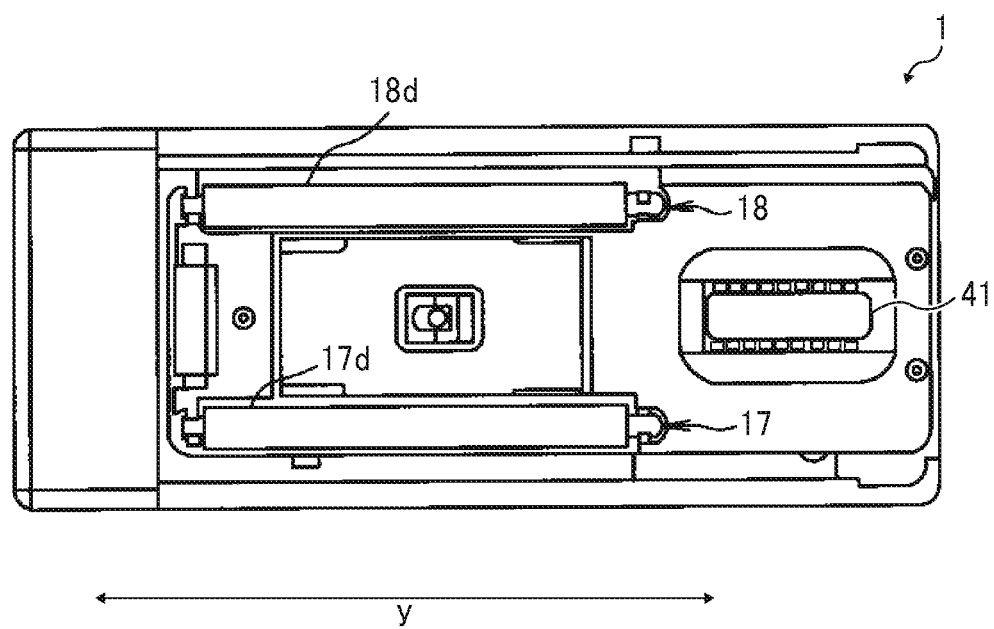
FIG. 20 is a bottom view illustrating a handheld printer according to Variation 5.

FIG. 20 is a bottom view illustrating the handheld printer 1 according to Variation 5. The left roller unit 17 of the handheld printer 1 includes only a long roller portion 17d as a roller portion. The right roller unit 18 also includes only a long roller portion 18d as a roller portion. Both of the long roller portions 17d and 18d are deviated to one end side from the recording section 41 in the orthogonal direction y to the scanning direction.

There is a layout constraint requiring the roller portion to be deviated from the recording section 41 toward the one end side in the direction orthogonal to the scanning direction. Under such a constraint, depending on the layout of the apparatus, providing one long roller portion is advantageous over providing a plurality of roller portions. That is, in some cases, the total length of the roller portion(s) can be increased. As the total length of the roller portion(s) increases, the straight traveling performance of the handheld printer 1 can further improve.

Preferably, the recording section 41 is positioned as far as possible from the center of the handheld printer 1 in the direction orthogonal to the scanning direction. In the example illustrated in FIG. 20, the recording section 41 is disposed at the end in the orthogonal direction y to the scanning direction. Accordingly, the long roller portions 17d and 18d can be sufficiently long.

The length of each of the long roller portions 17d and 18d is preferably equal to or greater than 20 mm and, more preferably, equal to or greater than 30 mm. Still more preferably, the length is equal to or greater than 40 mm. In the handheld printer 1 according to Variation 5, the length is equal to or greater than 40 mm.

Variation 6

Figure 21:
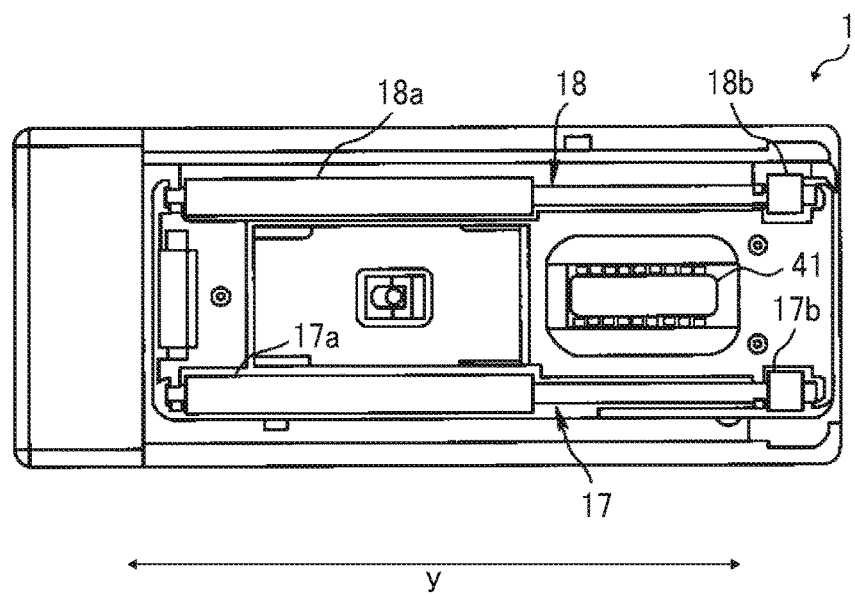
FIG. 21 is a bottom view illustrating a handheld printer according to Variation 6.

FIG. 21 is a bottom view illustrating the handheld printer 1 according to Variation 6. In the handheld printer 1, the first roller portions 17a and 18a of the roller units 17 and 18 are long roller portions. This structure further improves the straight traveling performance of the handheld printer 1.

Figure 22:
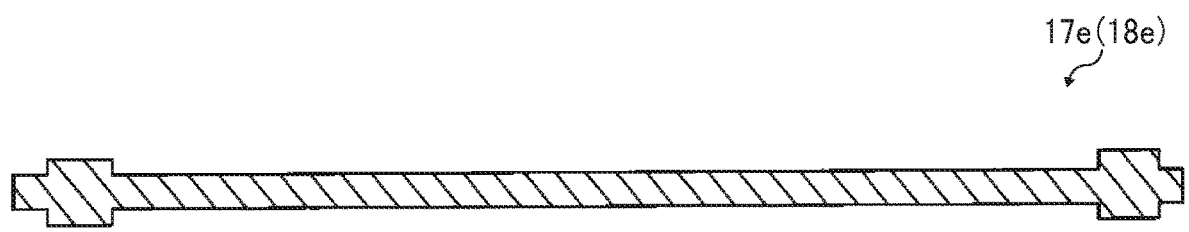
FIG. 22 is a vertical cross-sectional view illustrating a roller unit in which roller portions and a shaft are molded as a single piece of the same material, according to an embodiment.

In the above-described examples, the rubber roller portions (17a, 17b, 17d, 18a, 18b, and 18d) are attached to the metal shafts 17c and 18c. Alternatively, the shaft and the roller portion(s) can be molded as a single piece of the same material, as a roller member 17e (or 18e) illustrated in FIG. 22.

Although the descriptions above concern an example in which the present disclosure is applied to the handheld mobile printer of inkjet type, the aspects of the present disclosure can also be applied to image forming apparatuses of other types. The aspects of the present disclosure can be applied to a recording apparatus of, for example, thermal type or thermal-transfer type. A thermal-transfer type handheld mobile printer includes an ink ribbon as a container for storing liquid. Accordingly, a recess can be formed at the bottom of the ink ribbon, and a position sensor to detect the recording medium can be disposed in a space formed by the recess.

The configurations described above are examples, and various aspects of the present disclosure can attain, for example, the following effects, respectively.

Aspect 1

Aspect 1 concerns a mobile image forming apparatus (for example, the handheld printer 1) that includes a body (for example, the casing of the lower unit 3), a recording device (for example, the recording section 41) supported by the body, and a rotatable roller (for example, the left roller unit 17 and the right roller unit 18) provided to the body. The mobile image forming apparatus forms an image on a recording medium while the mobile image forming apparatus is moved in a scanning direction (for example, the direction indicated by arrow x) with the roller rotating on the surface of the recording medium (for example, the recording medium P). The mobile image forming apparatus further includes a pressing member (for example, the pressing flat spring 74) to press the roller in the axial direction of the roller.

In Aspect 1, the pressing member presses the roller in the axial direction, to retain the roller at one end side of a rattling space (in which the roller rattles) in the axial direction, thereby preventing the roller from rattling. This configuration can prevent the body of the mobile image forming apparatus from rattling on the roller in the roller axial direction when the mobile image forming apparatus is moved in the scanning direction for image formation. This configuration can suppress disturbance of the image caused by rattling of the mobile image forming apparatus body in the roller axial direction during the moving of the mobile image forming apparatus.

Aspect 2

In Aspect 2, the mobile image forming apparatus according to Aspect 1 includes a plurality of rollers arranged in the scanning direction and a plurality of pressing members to press the plurality of rollers in the axial direction, respectively.

Aspect 2 can improve the straight traveling performance of the mobile image forming apparatus while suppressing the disturbance of the image caused by rattling of the mobile image forming apparatus body, on any one of the rollers, in the roller axial direction during the moving of the mobile image forming apparatus.

Aspect 3

In Aspect 3, in Aspect 2, the plurality of the pressing member is arranged so as to press the plurality of rollers from the same side in the roller axial direction (longitudinal direction).

Aspect 3 can position the plurality of rollers at substantially the same position in the roller axial direction. Accordingly, Aspect 2 can suppress degradation of straight traveling performance of the mobile image forming apparatus, which occurs when the rollers are at different positions in the roller axial direction.

Aspect 4

According to Aspect 4, in Aspect 1, 2, or 3, the pressing member is fixed to the roller.

Aspect 4 can obviate attachment of the pressing member to the image forming apparatus body, thereby reducing the assembly cost.

Aspect 5

According to Aspect 5, in Aspect 1, 2, 3, or 4, the image forming apparatus body includes a recording side, which includes an opening to expose the recording device, and a grip portion (for example, the grip portion 36) to be gripped by a user. The grip portion is disposed on a first end side of the mobile image forming apparatus body in the direction (for example, the orthogonal direction y) along the recording side and orthogonal to the scanning direction, and the pressing member is disposed so as to press the roller from the first end side to a second end side in the orthogonal direction.

Aspect 5 can inhibit the deterioration of the straight traveling performance of the mobile image forming apparatus when the user moves the mobile image forming apparatus with his or her elbow placed on a desk.

Aspect 6

Aspect 6 concerns a body (e.g., the lower unit 3) of a mobile image forming apparatus (for example, the handheld printer 1). The mobile image forming apparatus includes the body provided with a rotatable roller (e.g., the roller units 17 and 18) and a recording device (e.g., the inkjet head 40) removably mounted in the body. The mobile image forming apparatus forms, with the recording device, an image on a recording medium (for example, the recording medium P) while the body is moved in a scanning direction (for example, the direction indicated by arrow x) with the roller rotating on the recording medium. The body further includes a pressing member (for example, the pressing flat spring 74) to press the roller in the axial direction of the roller.

Aspect 6 can suppress disturbance of the image caused by rattling of the mobile image forming apparatus body in the roller axial direction during the moving of the mobile image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. An image forming apparatus comprising:
a body including a first wall;
a recording device supported by the body, the recording device configured to form an image on a recording medium;
at least one roller connected to the body, the at least one roller configured to rotate on the recording medium while the body is moved in a scanning direction for image formation;
a bearing configured to rotatably support a respective one of the at least one roller, the bearing including a cut-out therein in a circumferential direction of the bearing; and
at least one pressing member configured to contact the at least one roller and press the at least one roller in an axial direction of the at least one roller when the respective one of at least one roller is supported by the bearing such that the respective one of the at least one roller is pressed against an inner surface of the first wall of the body.

2. The image forming apparatus according to claim 1, wherein
the at least one roller includes a plurality of rollers arranged in the scanning direction, and
the at least one pressing member includes a plurality of pressing members configured to press the plurality of rollers in the axial direction, respectively.

3. The image forming apparatus according to claim 2, wherein the plurality of pressing members is on a same side with respect to the plurality of rollers in the axial direction to press the plurality of rollers from the same side toward an opposite side in the axial direction.

4. The image forming apparatus according to claim 1, wherein the at least one pressing member is fixed to the at least one roller.

5. The image forming apparatus according to claim 1, wherein the body includes an opening on a recording side thereof, the opening exposing the recording device housed in the body, and a grip disposed on outer surfaces of side walls of the body facing in the scanning direction and configured to be gripped by a user.

6. The image forming apparatus of claim 1, wherein the image forming apparatus is a mobile image forming apparatus configured to form the image on the recording medium while the at least one roller rotates on the recording medium while the body is manually manipulated by a user to move the mobile mage forming apparatus in the scanning direction.

7. The image forming apparatus of claim 1, wherein the at least one pressing member is configured to suppress rattling of the body during movement of the image forming apparatus.

8. The image forming apparatus of claim 1, wherein the body is a lower portion of the image forming apparatus configured to house the recording device.

9. The image forming apparatus of claim 8, wherein the at least one pressing member is configured to suppress rattling of the lower portion of the image forming apparatus during movement of the image forming apparatus.

10. The image forming apparatus of claim 1, wherein the at least one pressing member is connected to a surface of a second wall of the body opposite the first wall and is configured to press the at least one roller against the surface of the first wall of the body.

11. A body configured to house a recording device of an image forming apparatus, the image forming apparatus configured to form an image on a recording medium, the body comprising:
at least one roller configured to rotate on the recording medium while the body is moved in a scanning direction for image formation;
a bearing configured to rotatably support a respective one of the at least one roller, the bearing including a cut-out therein in a circumferential direction of the bearing; and
at least one pressing member configured to contact the at least one roller and press the at least one roller in an axial direction of the at least one roller when the respective one of at least one roller is supported by the bearing such that the respective one of the at least one roller is pressed against an inner surface of a wall of the body.

12. The body according to claim 11, wherein the body includes an opening on a recording side thereof, the opening exposing the recording device housed in the body.

\* \* \* \* \*